(12) United States Patent
Kaneko et al.

(10) Patent No.: US 9,639,435 B2
(45) Date of Patent: May 2, 2017

(54) MANAGEMENT COMPUTER AND MANAGEMENT METHOD OF COMPUTER SYSTEM

(71) Applicant: HITACHI, LTD., Tokyo (JP)

(72) Inventors: Satoshi Kaneko, Tokyo (JP); Yukinori Sakashita, Tokyo (JP); Kyoko Miwa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 76 days.

(21) Appl. No.: 14/768,795

(22) PCT Filed: Nov. 11, 2013

(86) PCT No.: PCT/JP2013/080394
§ 371 (c)(1),
(2) Date: Aug. 19, 2015

(87) PCT Pub. No.: WO2015/068299
PCT Pub. Date: May 14, 2015

(65) Prior Publication Data
US 2015/0378848 A1 Dec. 31, 2015

(51) Int. Cl.
*G06F 11/00* (2006.01)
*G06F 11/14* (2006.01)
(Continued)

(52) U.S. Cl.
CPC ........ *G06F 11/1471* (2013.01); *G06F 11/142* (2013.01); *G06F 11/20* (2013.01);
(Continued)

(58) Field of Classification Search
CPC .................................................. G06F 11/1471
(Continued)

(56) References Cited

U.S. PATENT DOCUMENTS 8,160,056 B2 * 4/2012 Van der Merwe ...... H04L 45/04
370/351
8,874,954 B1 * 10/2014 Gupte ................. G06F 11/2028
714/1

(Continued)

FOREIGN PATENT DOCUMENTS

JP 2007-085680 A 4/2007
JP 2009-217373 A 9/2009
(Continued)

*Primary Examiner* — Dieu-Minh Le
(74) *Attorney, Agent, or Firm* — Volpe and Koenig, P.C.

(57) ABSTRACT

A management computer stores an operation requirement of a virtual machine and a scheme of a first configuration change executed by a host computer or a storage apparatus. The management computer determines whether a second configuration change configured so as to be executed automatically in the host computer or the storage apparatus is executed. If it is determined that the second configuration change is executed, the management computer predicts a performance index value concerning a prescribed performance index for the computer or the storage apparatus when executing the second configuration change. The management computer determines whether an anticipated effect value of the configuration change scheme is satisfied based on the predicted performance index value, and creates a substitution plan satisfying both an operation requirement and an anticipated effect value of the virtual machine where it is determined that the anticipated effect value is not satisfied.

14 Claims, 14 Drawing Sheets

(51) Int. Cl.
  *G06F 11/20* (2006.01)
  *G06F 11/34* (2006.01)
  *H04L 12/24* (2006.01)

(52) U.S. Cl.
  CPC ...... *G06F 11/2023* (2013.01); *G06F 11/2094* (2013.01); *G06F 11/3409* (2013.01); *H04L 41/0816* (2013.01); *G06F 2201/805* (2013.01); *G06F 2201/85* (2013.01); *H04L 41/147* (2013.01)

(58) Field of Classification Search
  USPC .............................. 714/3, 4.1, 4.2, 4.21, 5.11
  See application file for complete search history.

(56) References Cited

U.S. PATENT DOCUMENTS

| | | | |
|---|---|---|---|
| 9,348,627 B1* | 5/2016 | Palekar | G06F 9/45533 |
| 2004/0117766 A1* | 6/2004 | Mehta | G05B 11/32 717/121 |
| 2009/0138752 A1* | 5/2009 | Graham | G06F 11/1484 714/4.1 |
| 2010/0211949 A1 | 8/2010 | Nakajima et al. | |
| 2012/0005435 A1 | 1/2012 | Emaru et al. | |

FOREIGN PATENT DOCUMENTS

| | | |
|---|---|---|
| JP | 2010-191524 A | 9/2010 |
| WO | 2011/092738 A1 | 8/2011 |
| WO | 2013/084332 A1 | 6/2013 |

* cited by examiner

Fig. 4

Volume management table 801

| VOL ID (301) | Storage ID (302) | VOL type (303) | capacity (304) | Used capacity (305) | Target Port ID (306) | Initiator ID (307) | Initiator Port ID (308) | Source Storage ID (309) | Source Resource ID (310) |
|---|---|---|---|---|---|---|---|---|---|
| VOL1 | Storage1 | VVOL | 600GB | 500GB | Port1 | Host1 | Port1 | Storage1 | Pool 1 |
| VOL2 | Storage1 | VVOL | 200GB | 100GB | Port2 | Host2 | Port2 | Storage1 | Pool 2 |
| ... | ... | ... | ... | ... | ... | ... | ... | ... | ... |
| VOL50 | Storage1 | LDEV | 50GB | N/A | Port3 | Host3 | Port1 | Storage1 | Drive1 |
| VOL51 | Storage1 | LDEV | 50GB | N/A | N/A | N/A | N/A | Storage1 | Drive2 |
| ... | ... | ... | ... | ... | ... | ... | ... | ... | ... |
| VOL100 | Storage1 | VDEV | 100GB | 10GB | Port10 | Storage2 | Port20 | Storage1 | Pool10 |
| VOL101 | Storage1 | VDEV | 100GB | N/A | Port10 | Storage2 | Port21 | Storage1 | Drive10 |
| ... | ... | ... | ... | ... | ... | ... | ... | ... | ... |
| VOL200 | Storage2 | ExVOL | 100GB | N/A | Port10 | Host3 | Port1 | Storage1 | VOL100 |
| VOL201 | Storage2 | ExVOL | 100GB | N/A | N/A | N/A | N/A | Storage1 | VOL101 |
| ... | ... | ... | ... | ... | ... | ... | ... | ... | ... |

Fig. 5

Pool management table 802

| Storage ID 401 | Pool ID 402 | Page ID 403 | VOL ID 404 | VOL LBA 405 Start | End | VVOL ID 406 | VVOL LBA 407 Start | End |
|---|---|---|---|---|---|---|---|---|
| Storage1 | Pool A | 0000 | VOL1 | 0 | 0999 | VVOL2 | 0135000 | 0135999 |
| | | 0001 | | 1000 | 1999 | VVOL1 | 0094600 | 0094699 |
| | | 0002 | | 2000 | 2999 | N/A | - | - |
| | | ... | | ... | ... | ... | ... | ... |
| | | 1000 | VOL2 | 0 | 0999 | VVOL2 | 0055000 | 0055999 |
| | | ... | | ... | ... | ... | ... | ... |
| | | 2000 | VOL4 | 0 | 0999 | VVOL3 | 4398000 | 4398999 |
| | | ... | | ... | ... | ... | ... | ... |
| | | 2001 | VOL6 | 0000 | 0999 | VVOL1 | 0001000 | 0001999 |
| | | ... | | ... | ... | ... | ... | ... |
| ... | ... | ... | ... | ... | ... | ... | ... | ... |

Fig. 6

Drive management table 803

| Storage ID 501 | Drive ID 502 | High load determination reference usage rate (%) 503 | Read rate (MB/s) 504 | Write rate (MB/s) 505 | Measured time point 506 | usage rate (%) 507 |
|---|---|---|---|---|---|---|
| 001 | 001 | 50 | 600 | 500 | 2013-10-10 08:00:00 | 20 |
| | | | | | 2013-10-10 09:00:00 | 25 |
| | | | | | ... | ... |
| ... | ... | ... | | | ... | ... |

Fig. 7

Port management table 804

| Storage ID 601 | Port ID 602 | High load determination reference Read data transfer rate (MB/s) 603 | High load determination reference Write data transfer rate (MB/s) 604 | Measured time point 605 | Read data transfer rate (MB/s) 606 | Write data transfer rate (MB/s) 607 |
|---|---|---|---|---|---|---|
| 001 | 001 | 350 | 300 | 2013-10-10 08:00:00 | 200 | 100 |
| | | | | 2013-10-10 09:00:00 | 300 | 300 |
| ... | ... | ... | ... | ... | ... | ... |

Fig. 8

| CPU management table 805 | | | | |
|---|---|---|---|---|
| 701 | 702 | 703 | 704 | 705 |
| Storage ID | CPU ID | High load determination reference usage rate (%) | Measured time point | usage rate (%) |
| 001 | 001 | 50 | 2013-10-10 08:00:00 | 20 |
| | | | 2013-10-10 09:00:00 | 25 |
| | | | ... | ... |
| ... | ... | ... | ... | ... |

Fig. 9

Automatic configuration change management table 806

| | 901 | 902 | 903 | 904 |
|---|---|---|---|---|
| | Resource Owner ID | Resource ID | Condition | Result |
| 905 | Storage1 | VOL50 | I/O error | I/O paths switch to Storage2 VOL10 |
| 906 | Host10 | VM1 | Communication error between Hosts | Compute Resources used by VM switch to Host20 |
| 907 | Host20 | VM2 | Response time > 10ms | Storage resources used by VM switch to Storage2 VOL10 |
| | ... | ... | ... | ... |

Fig. 10

VM management table 807

| VM ID 1001 | Host ID 1002 | Service level 1003 | Operation schedule 1004 | Storage ID 1005 | VOL ID 1006 | Measured time point 1007 | IOPS 1008 | Response Time (ms) 1009 |
|---|---|---|---|---|---|---|---|---|
| VM1 | Host1 | Downtime = 0 ResponseTime<=10 ms | 08:00-18:00 | Storage1 | VOL1 | 2013-10-10 08:00:00 | 800 | 8.0 |
|  |  |  |  |  |  | 2013-10-10 09:00:00 | 850 | 8.0 |
|  |  |  |  |  |  | ... | ... | ... |
| VM2 | Host1 | Downtime <= 10ms ResponseTime<= 15ms | 00:00-24:00 | Storage1 | VOL3 | 2013-10-10 08:00:00 | 600 | 11.2 |
|  |  |  |  |  |  | ... | ... | 11.8 |
| ... |  |  | ... |  |  |  | ... | ... |

Fig. 11

Configuration change scheme management table 808  1101

| Configuration change scheme ID | Configuration change scheme detailed information ||||| 
| --- | --- | --- | --- | --- | --- |
| | Task ID 1102 | Task kind 1103 | Task parameter 1104 | Execution start time point 1105 | Anticipated effect value 1106 |
| 1 | Task 1 | Change CPU Allocation | Object VOL: Storage 1, VOL 1<br>CPU before change: CPU 1<br>CPU after change: CPU 2 | 2013/10/03/18:00:00 | 20% <= CPU1, CPU2<br>Availability <= 30% |
| 2 | Task 1 | Pool Expand | Object pool: Pool A<br>Added media: SSD 30G | 2013/10/10/18:00:00 | Average Response time of VM 50 <= 15 ms |
| | Task 2 | Volume Migration | Migration VVOL: VVOL 3<br>Migration source pool: Pool 3<br>Migration destination pool: Pool A | N/A | |
| ... | ... | ... | ... | ... | ... |

Fig. 12

| Configuration changing method table 809 | | |
|---|---|---|
| 1201 | 1202 | 1203 |
| Configuration changing method | Execution subject | Characteristic |
| Volume Migration | Storage1, Storage2 | Downtime = 10.0ms |
| CPU allocation change | Storage1, Storage2 | Downtime = 1.0ms |
| VM data migration | Host1 | Downtime = 10.0ms |

MANAGEMENT COMPUTER AND MANAGEMENT METHOD OF COMPUTER SYSTEM

TECHNICAL FIELD

This invention relates to a management computer and a management method of a computer system.

BACKGROUND ART

In recent years, there is used a cluster technology as a technology for improving availability in a hardware failure or an application failure. In a storage system including plural storage apparatuses, there is known a technology of improving availability of the system when a failure occurs in a first storage apparatus, by feeding data which is to be fed to the first storage apparatus, to a second storage apparatus by a host computer (PTL 1).

PTL 2 manages a situation of a virtual logical volume (hereinafter, referred to as VVOL) configured by plural virtual areas and detects a VVOL under an inappropriate situation. The VVOL is related to a pool for providing a storage area. PTL 2 tries to improve a situation by migrating the VVOL under the inappropriate situation from a current pool to other pool.

CITATION LIST

Patent Literature

[PTL 1]
Japanese Patent Application Laid-open No. 2007-085680
[PTL 2]
WO 2011/092738

SUMMARY OF INVENTION

Technical Problem

In an operation management of a computer system, there is a case where a configuration change scheme is worked out and executed for improving a state of a storage system. In this case, for example, it is necessary to select an actually executed scheme from plural configuration change schemes, or obtain an approval of an upper manager for a selected configuration change scheme. Consequently, a constant period of time is ordinarily required from when an improvement in a state is needed until the configuration change scheme is actually executed.

For example, in a case where it is previously defined to execute an automatic configuration change in accordance with a condition such that a cluster is switched when a failure occurs other than the schematic configuration change, if a hardware failure or an application failure occurs during a time period until the configuration change scheme is executed, the automatic configuration change can be executed against the failures.

If the automatic configuration change is executed, for example, there is a possibility of changing an I/O (Input/Output) route from an application to a physical disk of a storage apparatus, or changing a state of a computer resource related to an I/O processing operation. Consequently, even if the configuration change scheme configured based on a state before an occurrence of the change is executed as scheduled, there is a case where an effect that is initially anticipated cannot be achieved.

As described above, time is required until actually executing the configuration change scheme configured by the computer system manager. Consequently, there is a case where the automatic configuration change configured beforehand in response to a failure or the like is executed at an earlier stage, and in that case, there is a possibility that the prepared configuration change scheme cannot achieve an anticipated object.

This invention has been carried out in view of the problem described above, and it is one of objects thereof to provide a management computer and a management method of a computer system enabled to modify a configuration change which is configured beforehand so as to be executed in accordance with a prescribed condition in consideration of a change in the state of a computer and a storage apparatus.

Solution to Problem

A management computer according to an aspect of the invention is a management computer coupled to a computer and a storage apparatus. The management computer includes a memory storing a piece of first configuration information indicating plural logical storage areas provided by the storage apparatus, a piece of second configuration information stored in a first logical storage area among the plural logical storage areas and indicating an operation requirement of a prescribed object executed by the computer, and a piece of configuration change scheme information indicating a scheme of a first configuration change scheduled to be executed by the computer or the storage apparatus, and a microprocessor coupled to the memory. The microprocessor determines whether a second configuration change configured beforehand so as to be executed in accordance with a prescribed condition in the computer or the storage apparatus is executed. In a case where it is determined that the second configuration change is executed, the microprocessor predicts a performance index value concerning a prescribed performance index for the computer or the storage apparatus in a case of executing the second configuration change, determines whether an anticipated effect value previously configured concerning the configuration change scheme is satisfied based on the predicted performance index value, and creates a substitution plan satisfying both of the operation requirement and the anticipated effect value of the prescribed object in a case where it is determined that the anticipated effect value is not satisfied.

BRIEF DESCRIPTION OF DRAWINGS

FIG. 4 shows an example of a table managing a volume.
FIG. 5 shows an example of a table managing a pool.
FIG. 6 shows an example of a table managing a drive.
FIG. 7 shows an example of a table managing a communication port.
FIG. 8 shows an example of a table managing a microprocessor.
FIG. 9 shows an example of table managing a configuration change executed automatically.
FIG. 10 shows an example of a table managing a virtual machine.

FIG. 11 shows an example of a table managing a configuration change scheme.

FIG. 12 shows an example of a table managing configuration changing method.

DESCRIPTION OF EMBODIMENTS

Figure 1:
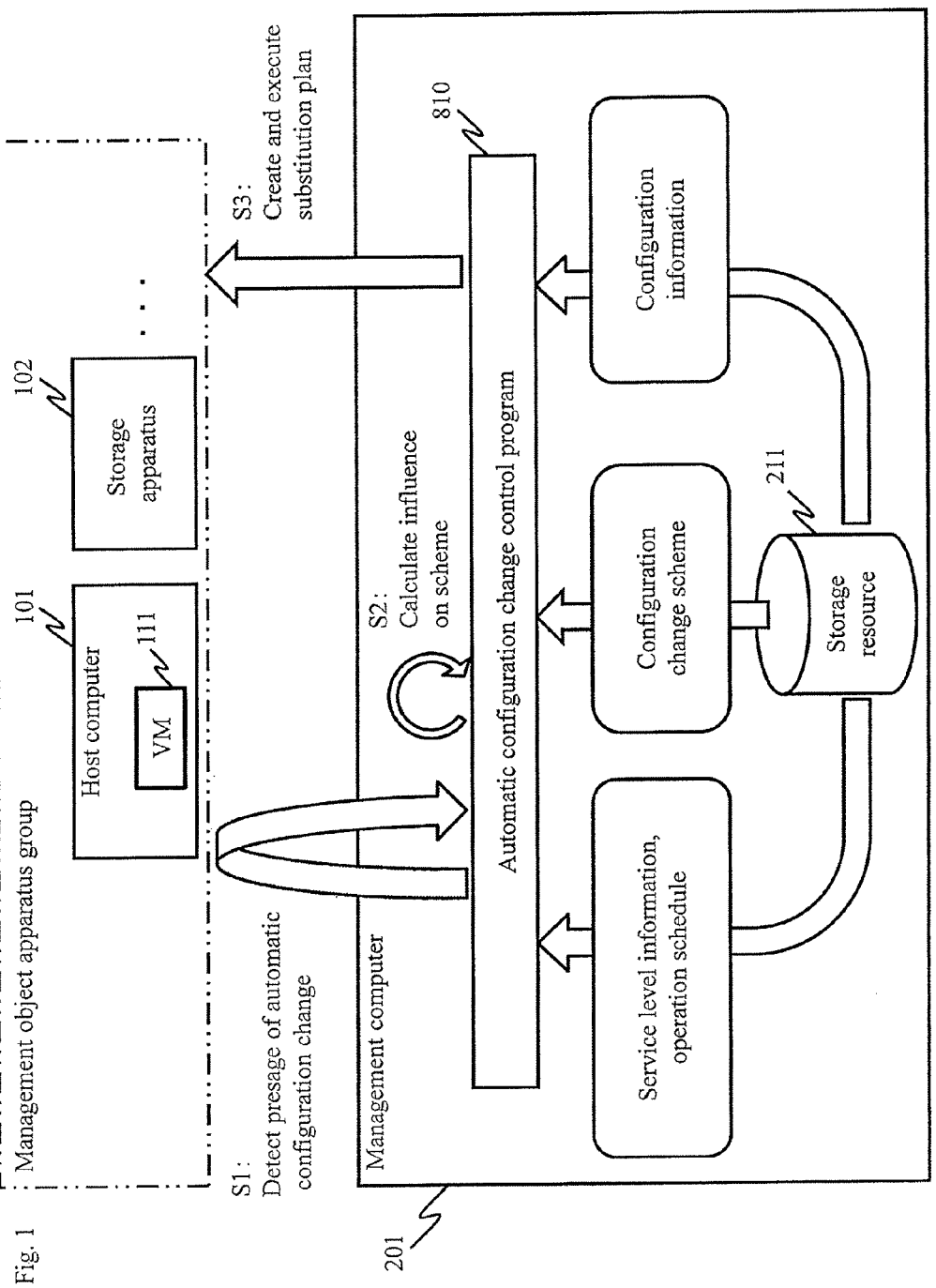
FIG. 1 is an explanatory diagram showing an outline of this embodiment.

This embodiment will be explained in reference to the drawings. Incidentally, embodiments explained below do not limit the invention in accordance with a scope of claims explained below. Also, all of various elements and combinations thereof explained in the embodiments are not necessarily indispensable for resolving means of the invention.

Incidentally, although in the following explanation, various kinds of information may be explained by an expression of "aaa table", the various kinds of information may be expressed by a data structure other than the table. "aaa table" can be referred to as "aaa information" in order to indicate independency from the data structure.

Further, in the following explanation, there is a case of explaining processing operations with a management computer and a host computer simply as subjects, it is shown that the processing operations are executed by a microprocessor (for example, CPU (Central Processing Unit)) included by a control device provided by a computer. Similarly, in a case of explaining processing operations with a storage apparatus simply as a subject, it is shown that a controller provided by the storage apparatus executes the processing operations. Also, at least one of the control device and the controller may be a processor per se, or may include a hardware circuit executing a portion or a total of processing operations executed by the control device or the controller.

A computer program may be installed from a program source to respective computers or a storage system. The program source may be, for example, a program distribution server or storage media.

This embodiment assumes an environment in which it is necessary to obtain an approval beforehand from a person in charge of an arbitrary system management department in order to execute a configuration change scheme for a host computer or a storage apparatus by a system manager.

Under such an environment, a created configuration change scheme cannot dynamically be modified and executed in accordance with an actual situation. Because the created configuration change scheme cannot be executed unless an approval is obtained again from a person in charge by a content as modified.

Consequently, in a case where a dynamic configuration change for dealing with a failure or the like as in, for example, cluster switching, there is a concern that the configuration change scheme which has obtained the approval beforehand is useless. If a system configuration at a time point of creating the configuration change differs from a system configuration after executing the dynamic configuration change, even when the approved configuration change scheme is executed as scheduled, there is a possibility that an anticipated effect cannot be achieved.

Although it is preferable that the configuration change scheme can be executed after adjusting the scheme in accordance with a system configuration in a current state in order to achieve the anticipated effect, as described above, under the environment assumed by the embodiment, the configuration change scheme cannot be executed unless the approval is obtained from the person in charge of the system management department.

Consequently, if the configuration change dynamically executed in accordance with the current state of the system, and the configuration change scheme planned beforehand by a manager for improving an operational situation or the like are executed independently from each other, there poses a problem that a system management efficiency is low.

Hence, according to the embodiment, in a case where there is a configuration change scheme (first configuration change) prepared beforehand, a content of a configuration change (second configuration change) executed in accordance with the current state of the system configuration is modified such that a predicted effect of the configuration change is obtained.

Example 1

FIG. 1 shows an outline of a first embodiment. A computer system includes, for example, at least one host computer 101 and at least one storage apparatus 102, and the host computer 101 and the storage apparatus 102 are coupled to at least one management computer 201 so as to be able to communicate bidirectionally.

The management computer 201 includes a storage resource 211 configured by, for example, a main storage, an auxiliary storage and the like. The storage resource 211 included by the management computer 201 stores, for example, service level information and an operation schedule of a VM (Virtual Machine) 111, information concerning a configuration change scheme scheduled to be executed by the host computer 101 or the storage apparatus 102, and configuration information from the VM 111 to a storage area of the storage apparatus 102.

An automatic configuration change control program 810 included by the management computer 201 is a control program for modifying a content of a configuration change (second configuration change) executed automatically in accordance with a current state of a computer system.

The automatic configuration change control program 810 detects a presage of executing an automatic configuration change from the host computer 101 and the storage apparatus 102 which are management targets (S1). A method of detecting the presage will be described later. The automatic configuration change control program 810 acquires the service level information and the operation schedule configured to the VM 111, the information of the configuration change scheme scheduled to be executed, and the configuration information from the VM 111 to the storage area of the storage apparatus 102 from the storage resource 211. The automatic configuration change control program 810 calculates an influence on the configuration change scheme scheduled to be executed in a case of executing the automatic configuration change based on the information acquired from the storage resource 211 (S2). In the following, there is a case of referring the configuration change scheme scheduled to be executed simply as a configuration change scheme.

If it is determined that the configuration change scheme does not satisfy the anticipated effect value scheduled by the configuration change scheme cannot be satisfied as a result of the calculation described above, the automatic configuration change control program 810 modifies a content of the automatic configuration change in consideration of the configuration change scheme. For example, the automatic configuration change control program 810 creates a substitution plan of the automatic configuration change by using the service level information and the operation schedule configured to the VM 111, information of the configuration change scheme, and the configuration information from the VM 111 to the storage area of the storage apparatus 102. The substitution plan is created to satisfy also the anticipated effect value scheduled by the configuration change scheme while maintaining the service level (S3). When the substitution plan is created, the automatic configuration change control program 810 can also indicate the host computer 101 or the storage apparatus 102 to execute the substitution plan (S3). As described below, in a case where the substitution plan satisfying the anticipated effect value of the configuration change scheme cannot be created, the automatic configuration change control program 810 can stop executing the configuration change scheme.

Figure 2:
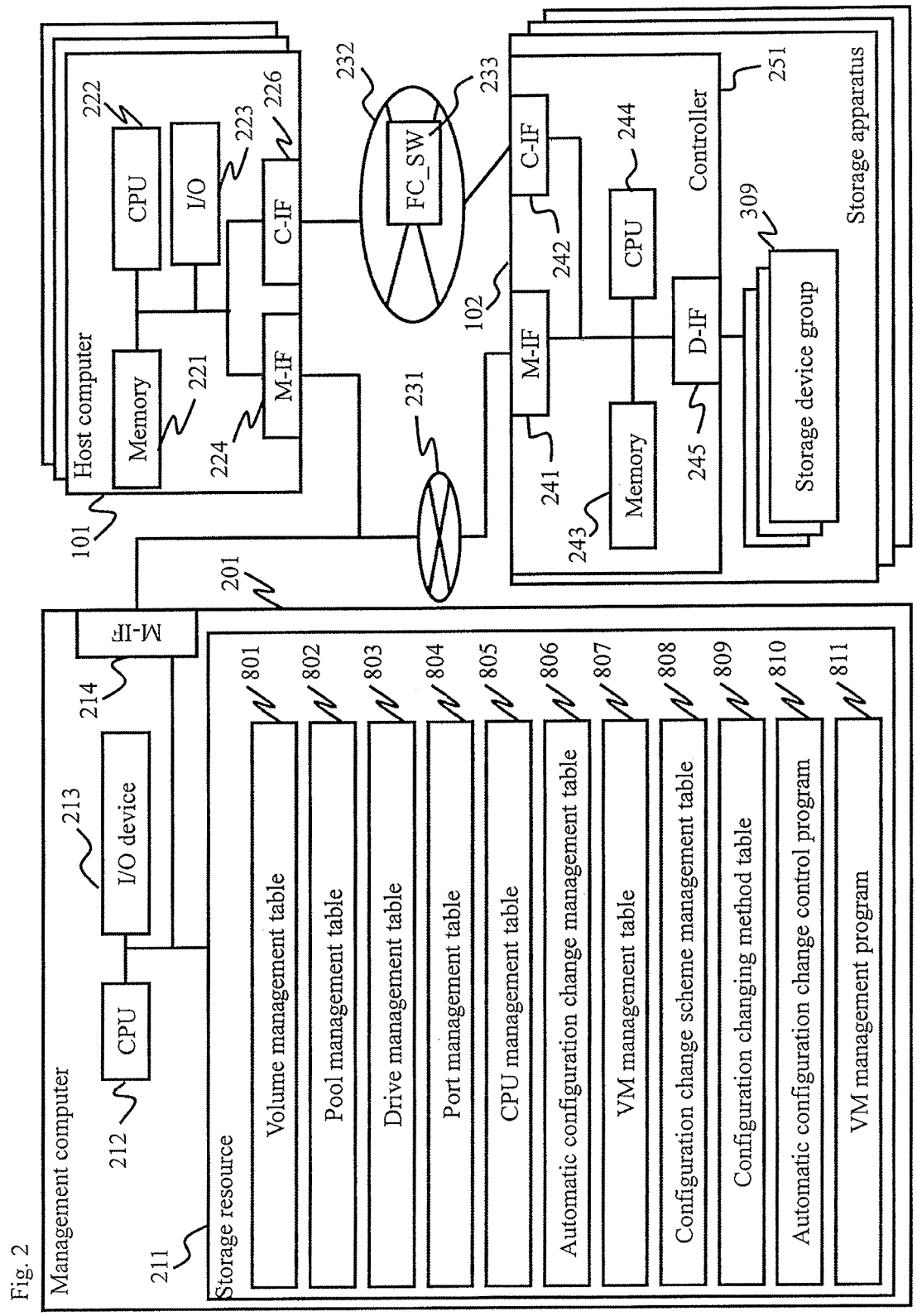
FIG. 2 is a configuration diagram of a computer system.

FIG. 2 shows a configuration example of a computer system. The storage apparatus 102 is coupled to the management computer 201 and the host computer 101 via a first communication network 231 of, for example, LAN (Local Area Network) or the like. The storage apparatus 102 is coupled to the host computer 101 via a second communication network 232 of, for example, SAN (Storage Area Network) or the like. The second communication network 232 can include one or more of switch(es) 233. Incidentally, the first communication network 231 and the second communication network 232 may integrally be configured.

The storage apparatus 102 includes, for example, plural physical storage device group 309, and a controller 251 coupled to the physical storage device group 309. The physical storage device group 309 is configured by one or more of physical storage device(s).

As the physical storage device, for example, there is an SSD (Solid State Drive), an SAS (Serial Attached SCSI)-HDD, an SATA (Serial ATA (Advanced Technology attachment))-HDD or the like. An MRAM (Magnetoresistive Random Access Memory), a phase change memory (Phase-Change Memory), an ReRAM (Resistive random-Access memory), an FeRAM (Ferroelectric Random Access Memory) or the like may be used as the physical storage device.

The storage apparatus 102 can be provided with plural physical storage device groups having different performances in a mixed manner. Incidentally, the physical storage device group may be provided from outside of the storage apparatus 102. That is, for example, the storage apparatus 102 can be coupled to physical storage device group included by other storage apparatus and used as if the physical storage device group of the other storage apparatus were a storage device group inherent to the storage apparatus 102.

The controller 251 includes, for example, a management interface (hereinafter, described as M-I/F) 241, a communication interface 242 (hereinafter, described as C-I/F) 242, a device interface (hereinafter, described as D-I/F) 245, a memory 243, and a microprocessor 244 coupled to these. Hereinafter, there is a case where the microprocessor is abbreviated as processor.

The M-I/F 241 is a communication interface apparatus for communicating by a first protocol, and is, for example, NIC (Network Interface Card). The C-I/F 242 is a communication interface apparatus for communicating by a second protocol.

The D-I/F 245 is a communication interface apparatus for communicating with the physical storage device group 309 by a third protocol. The D-I/F 245 may be prepared for each kind of the physical storage device. The controller 251 accesses to the physical storage device via the D-I/F 245.

The memory 243 stores computer programs executed by the processor 244 and various kinds of information. The memory 243 includes a cash memory area. The cash memory area is temporarily stored with, for example, a write target data received from the host computer 101, a read target data read from an actual data preserving area (hereinafter, referred to as page) on the physical storage device and the like. The write target data in the cash memory area is stored to the physical storage device allocated to a virtual area of a write destination. The read target data in the cash memory area is provided to the host computer 101.

The host computer 101 is configured by including, for example, an M-I/F 244, a C-I/F 226, a storage resource 221, a processor 222 coupled to these, an I/O device 223 and the like.

The M-I/F 224 is, for example, an NIC. The C-I/F 226 is, for example, an HBA (Host Bus Adapter). The storage resource 221 is, for example, a memory. The storage resource 221 may include an auxiliary storage apparatus of an HDD (Hard Disk Drive) or the like. The storage resource 221 stores, for example, an application program of an operation program or the like, an OS (Operating System) or the like. The processor 222 executes the application program or the OS stored to the storage resource 221. The I/O device 223 includes an input unit receiving an input from a user (for example, keyboard, switch, pointing device, microphone, camera or the like), and an output unit displaying various kinds of information to a user (for example, display apparatus, speaker or the like).

The management computer 201 is configured by including, for example, an M-I/F 214, a storage resource 211, a processor 212 coupled thereto, an I/O device 213 and the like. The M-I/F 214 is, for example, an NIC. The I/O device 213 is similar to the I/O device 223.

The storage resource 211 is, for example, a memory, and may include an auxiliary storage apparatus of an HDD or the like. The storage resource 211 stores a computer program and various kinds of information. The computer program is executed by the processor 212.

The storage resource 211 stores, as information, a volume management table 801, a pool management table 802, a drive management table 803, a port management table 804, a CPU management table 805, an automatic configuration change management table 806, a VM management table 807, a configuration change management table 808, and a configuration changing method table 809. The storage resource 211 stores an automatic configuration change control program 810 and a VM management program 811 as computer programs.

The above-described is a configuration example of a hardware or the like of the computer system concerning the embodiment. Incidentally, the communication interface devices used in the M-I/F, the C-I/F and the like described above are not limited to an HBA and an NIC. The communication interface device differs by, for example, kinds of networks to which the I/F's are coupled, or kinds of apparatus having the I/F's.

Figure 3:
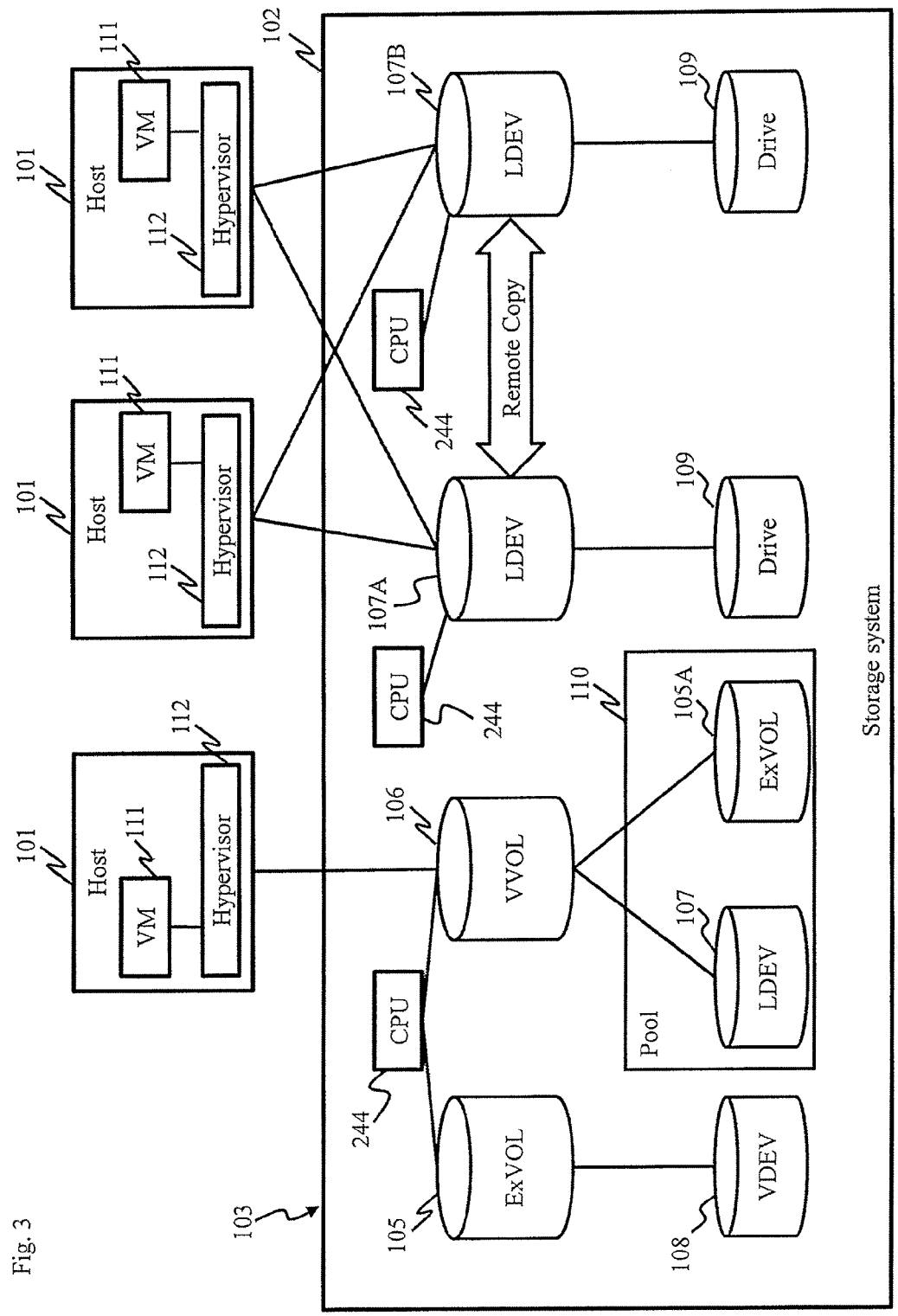
FIG. 3 is an explanatory diagram showing an outline of a storage structure.

FIG. 3 shows an outline of a storage structure or the like of the computer system. The storage system 103 is configured by one or more of the storage apparatus 102. At least one of the storage apparatus 102 is a storage apparatus to which Thin Provisioning Technology is applied. The thin provisioning technology is a technology of defining a virtual storage capacity and providing the virtual storage capacity to the host computer 101 regardless of a physical storage capacity which is actually provided. The storage system 103 includes plural logical volumes configured by an actual area of the physical storage device group 309 and having different characteristics. Hereinafter, there is a case of referring a volume as VOL.

The storage system 103 of this embodiment can use three kinds of volumes of an LDEV, an ExVOL, and a VVOL. An LDEV 107 is a volume configured by a drive 109 indicating a physical storage device. An ExVOL 105 is a volume configured by a VDEV 108. The VDEV 108 is an intermediate volume coupled to a volume provided to an external storage apparatus.

A VVOL 106 is a virtual volume configured based on the thin provisioning technology, and created by using actual areas (actual storage areas, also referred to as pages) of plural volumes registered to a pool 110.

The drive 109 can be configured by, for example, an SSD, an SAS-HDD, an SATA-HDD, an MRAM, a Phase Change Memory, an ReRAM, an FeRAM or the like as explained in the physical storage device group 309.

The storage system 103 includes one or more of the pool(s) 110 (in FIG. 3, only one of them is illustrated). Each pool 110 includes plural pool volumes having different performances. As the pool volumes, there are an actual volume (LDEV) provided at an inner portion of the storage apparatus 102, and an external coupled volume (ExVOL) coupled to the actual volume provided at an external portion of the storage apparatus 102. The pool volumes are partitioned to plural pages. Basically, the pool volume belongs to only one pool, and does not belong to plural pools.

The storage system 103 includes plural VVOL's 106 (in FIG. 3, only one of them is illustrated). As described above, the VVOL 106 is a virtual logical volume in accordance with the thin provisioning technology, and is configured by plural virtual areas which are virtual storage areas. The virtual area is, for example, an address of LBA (Logical Block Addressing) or the like.

In a case where the storage system 103 receives a write command designating the VVOL 106 as a write destination from the host computer 101, the storage system 103 determines whether a page which is an actual area is allocated to a designated virtual area.

When it is determined that a page is not allocated to the designated virtual area, the storage system 103 writes a write target data to the page. When it is determined that the page is not allocated to the designated virtual area, the storage system 103 selects an unused page from the pool 110 to which the VVOL 106 of the write target is related. The storage system 103 allocates the selected unused page to the designated virtual area, and writes a data of the write target to the allocated page.

The host computer 101 is an example of an access source to the storage system 103. The host computer 101 includes a hypervisor 112 logically creating and executing the VM (Virtual Machine) 111.

The hypervisor 112 can control the plural VMs 111 once. Each of the plural VMs 111 can execute an application as if the plural VMs 111 were stand-alone physical computers. The hypervisor 112 can carry out VM migration of migrating the VM 111 operated on a certain host computer to other computer.

The VVOL 106 is provided to one or more of VM('s) 111. A connection between the host computer 101 and the VVOL 106 in FIG. 3 does not signify physical coupling, but indicates that the VVOL 106 is provided to the host computer 101, and is recognized by the host computer 101. Similarly, also a connection between the pool 110 and the VVOL 106 does not signify physical coupling, but indicates that the VVOL 106 is related to the pool 110.

The host computer accesses to the provided VVOL 106 in accordance with a request of the VM 111. Specifically, the host computer 101 transmits an access command having access destination information to the storage system 103. The access destination information is information expressing an access destination, and includes, for example, an ID (identifier) of the VVOL 106 of an LUN (Logical Unit Number) or the like, and an ID of a virtual area of the LBA or the like.

The processor 244 is corresponded to one or more of volume(s). The processor 244 executes various processing operations concerning a volume of a control object of, for example, an I/O processing operation of the volume, a processing operation concerning page allocation of the VVOL 106 or the like. The single processor 244 can also control the plural volumes.

Both of an LDEV 107A and an LDEV 107B are actual volumes, and configure a remote copy pair. The LDEV 107A on one side and the LDEV 107B on the other side are provided to storage apparatus respectively different from each other.

For example, the LDEV 107A is a primary volume (PVOL), and the LDEV 107B is a secondary volume (SVOL). In the remote copy pair, when a data is written to the LDEV 107A (PVOL), the written data is copied to the LDEV 107B (SVOL) synchronously or asynchronously.

In a case where a failure occurs in the storage apparatus including the LDEV 107A, an I/O request from the host computer 101 to the LDEV 107A becomes an error. Hence, the host computer 101 switches the access destination to the LDEV 107B. Thereby, an application operated at the host computer 101 is not stopped and an operation can be continued without stopping.

FIG. 4 shows the volume management table 801. The volume management table 801 manages information concerning the volume provided to the storage system 103. The volumes which become management targets of the volume management table 801 may be all of the volumes provided to the storage system 103, or only portions thereof.

In a case where the target volume is the VVOL 106, the VVOL 106 can specify the host computer 101 providing the virtual storage area, and the pool 110 allocating the page to the VVOL 106 by using the volume management table 801. In a case where the target volume is the LDEV 107, the LDEV 107 can specify the host computer 101 providing the storage area, and the drive 109 allocating the page to the LDEV 107. In a case where the target volume is the VDEV 108, the VDEV 108 can specify the storage apparatus 102 proving the storage area, and the pool 110 allocating the page to the drive 109 providing the storage area to the VDEV 108 or the VDEV 108. In a case where the target volume is the ExVOL 105, the ExVOL 105 can specify the host computer 101 providing the storage area, and the VDEV 108 allocating the page to the ExVOL 105.

The management computer 201 updates the volume management table 801 by collecting information from the storage apparatus 102 periodically, or with an information collect request inputted by a user via the I/O device 213 as a trigger.

The volume management table 801 manages, for example, a volume ID 301, a storage ID 302, a volume type 303, a storage capacity 304, a used capacity 305, a target port ID 306, an initiator ID 307, an initiator port ID 308, a source storage ID 309, and a source resource ID 310 in correspondence with each other.

The volume ID 301 is information for identifying a volume. The storage ID 302 is information for identifying the storage apparatus 102 having the volume. The volume type 303 indicates that a type of the volume is any of the VVOL, the LDEV, the VDEV, and the ExVOL. The storage capacity 304 indicates a storage capacity of the volume. The used capacity 305 indicates a total amount of the page allocated from the pool 110 to the VVOL 106. N/A (not applicable: not relevant) is described to a volume the source resource 310 of which is other than "pool".

The target port ID 306 is information for identifying a target port related to a volume in communication ports provided to the storage apparatus 102. The initiator ID 307 is information of identifying the host computer 101 or the storage apparatus 102 which is a destination for providing the volume. In the example of FIG. 4, in a case where the volume type 303 is the VVOL, the LDEV, or the ExVOL, the initiator ID 307 is stored with information for identifying the host computer 101. In a case where the volume type 303 is VDEV, the initiator ID 307 is stored with information for identifying the storage apparatus 102. The initiator port ID 308 is information of identifying an initiator port of the host computer or an initiator port of the storage apparatus which is a destination for providing the volume.

The source storage ID 309 is information for identifying the storage apparatus providing the volume. The source resource ID 310 is information for identifying an element (pool 110, device 109) providing the storage area of the volume. In an example of FIG. 4, in a case where the volume type 303 is the VVOL, the source resource ID 310 is stored with information of identifying the pool 110. In a case where the volume type 303 is LDEV, the source resource ID 310 is stored with information of identifying the drive 109.

In a case where the volume type 303 is VDEV, the source resource ID 310 is stored with either of information of identifying the pool 110, or information of identifying the drive 109 which is related to the VVOL. In a case where the volume type 303 is the ExVOL, the source resource ID 310 is stored with information of identifying an external volume coupled to the ExVOL. The external volume is a volume of the logical volumes provided to the external storage apparatus which is coupled to the ExVOL.

Incidentally, in the example of FIG. 4, in a case where the volume is not allocated to either of the host computer or the storage apparatus, N/A (not applicable: not relevant) is described to the target port ID 306, the initiator ID 307, and the initiator port ID 308.

FIG. 5 shows the pool management table 802. The pool management table 802 stores information of the pool 110. A corresponding relationship among the volume configuring the pool 110, the respective pages accumulated to the pools, and the virtual area of the VVOL 106 can be specified by the pool management table 802. The management computer 201 updates the pool management table 802 by collecting information from the storage apparatus 102 periodically, or with reception of an information collect request from the I/O device 213 by a user as a trigger.

The pool management table 302 includes, for example, the following information. A storage ID 401 is information for identifying the storage apparatus 102 having the pool 110. A pool ID 402 is information for identifying the pool 110. A page ID 403 is information for identifying the page belonging to the pool 110. A volume ID 404 is information for identifying a volume having a page. A volume LBA 405 is information indicating a position of the page in the volume (for example, LBA at head of a page and LBA at end of the page). A VVOL ID 406 is information for identifying the VVOL having a virtual area at a destination of allocating the page. "N/A (Not/Assigned)" indicates that the page is not allocated to any virtual area. A VVOL LBA 407 is information indicating a position of the virtual area of the destination of allocating the page (for example, LBA at head of a virtual area and LBA at end of the virtual area).

FIG. 6 shows the drive management table 803. The drive management table 803 stores information of the drive 109. An usage rate which becomes a reference for determining whether the drive is at a high load, an I/O performance, and history information of the usage rate are known by the drive management table 803. The management computer 201 updates the drive management table 803 by collecting information from the storage apparatus 102 periodically, or with reception of an information collect request from the I/O device 213 by a user as a trigger.

The drive management table 803 manages, for example, a storage ID 501, a drive ID 502, an usage rate 503 for a reference of determining a high load, a read rate 504, a write rate 505, a measured time point 506, and an usage rate 507 in correspondence with each other.

The storage ID 501 is information of identifying the storage apparatus 102 having the drive 109. The drive ID 502 is information of identifying the drive 109. The usage rate 503 for a reference of determining a high load indicates an index of an usage rate at which a performance of the drive 109 is lowered. The read rate 504 is a read rate (MB/s) of the target drive. The write rate 505 is a write rate (MB/s) of the target drive. The measured time point 506 is a time point at which the read rate 304, the write rate 505, and the usage rate 507 are measured. The measured time point can include year, month, and day although the same goes with the following tables. The usage rate 507 is a measured value of an usage rate of the target drive. The high load determining reference usage rate 503 is determined in accordance with a specification of the storage apparatus 102.

FIG. 7 shows the port management table 804. The port management table 804 stores information for managing the C-IF 242 of the storage apparatus 102. A read data transfer rate and a write data transfer rate which become a high load determination reference of a communication port, history information of the read data transfer rate, and history information of the write data transfer rate are known by using the port management table 804. The management computer 201 updates the port management table 804 by collecting information from the storage apparatus 102 periodically, or with reception of an information collect request from the I/O device 213 by a user as a trigger.

The port management table 804 manages, for example, a storage ID 601, a port ID 602, a read data transfer rate 603 for a high load determination reference, a write data transfer rate 604 for a high load determination reference, a measured time point 605, a read data transfer rate 606, and a write data transfer rate 607 in correspondence with each other.

The storage ID 601 is information of identifying the storage apparatus 102 having the C-IF 242. The port ID 602 is information of identifying the C-IF 242. The read data transfer rate 603 for the high load determination reference indicates an index of a transfer rate of a read data when the performance of the C-IF 242 is lowered. The write data transfer rate 604 for the high load determination reference indicates an index of a write data transfer rate when the performance of the C-IF 242 is lowered. The measured time point 605 is a time point when the performance of the object port (read data transfer rate 606, write data transfer rate 607) is measured. The read data transfer rate 606 is a rate of reading data from the target port per unit time, and is a measured value of a read rate. The write data transfer rate 607 is a rate of writing data to the target port per unit time and is a measured value of a write rate. The high load determination reference usage rates 603 and 604 are determined in accordance with a specification of the storage apparatus 102.

FIG. 8 shows the CPU management table 805. The CPU management table 805 manages information concerning the processor 244 of the storage apparatus 102. An usage rate which becomes a reference for determining whether the processor 244 is at a high load, and history information of the usage rate are known by the CPU management table 805. The management computer 201 updates the CPU management table 805 by collecting information from the storage apparatus 102 periodically, or with reception of an information collect request from the I/O device 213 by a user as a trigger.

The CPU management table 805 manages, for example, a storage ID 701, a CPU ID 702, an usage rate 703 for a high load determination reference, measured time point 704, and an usage rate 705 in correspondence with each other.

The storage ID 701 is information of identifying the storage apparatus 102 having the processor 244. The CPU ID 702 is information of identifying the target processor 244. The usage rate 703 for the high load determination reference is information indicating an index of an usage rate at which the performance of the processor 244 is lowered. The measured time point 704 is information indicating a time point of measuring the performance of the object processor 244. The usage rate 705 indicates a measured value of an usage rate of the target processor 244. The usage rate 703 for the high load determination reference is determined in accordance with a specification of the storage apparatus 102.

FIG. 9 shows a table 806 managing a configuration change executed automatically. The automatic change configuration change management table 806 manages configuration information for changing a configuration in accordance with an arbitrary condition. The management computer 201 collects information from the computer system and updates the automatic configuration change management table 806 by the information periodically, or with reception of an information collect request from the I/O device 213 by a user as a trigger.

For example, the management computer 201 collects information concerning a configuration change executed at the storage apparatus 102 from the storage apparatus 102. Further, the management computer 201 collects information concerning a configuration change executed at the host computer 101 from the host computer 101. In a case where a host management computer managing the host computer 101 is included in the computer system, the management computer 201 may collect information concerning a configuration change executed at the host computer 101 from the host management computer (not illustrated).

In a case where a configuration executing a configuration change in accordance with an arbitrary condition (configuration concerning an automatic configuration change) is executed via the management computer 201, the management computer 201 may collect input information concerning the configuration to store to the automatic configuration change management table 806.

The automatic configuration change management table 806 manages, for example, a resource owner ID 901, a resource ID 902, a condition 903, and a result 904 in correspondence with each other.

The resource owner ID 901 is information indicating a subject having a resource which is a target of the configuration change. As the subject, for example, there is the storage apparatus 102, the host computer 101, the switch 233 or the like. The resource ID 902 is information of identifying the resource which is the target of the configuration change. As the target resource of the configuration change, there is, for example, a logical volume, a virtual machine, a communication port or the like.

The condition 903 is an example of "a prescribed condition", and is information indicating a condition by which the configuration is changed automatically. As the condition, there is, for example, a case where an I/O error occurs, a case where a communication error occurs between the host computers, a case where response time exceeds prescribed response time or the like. The result 904 is information indicating a result of the configuration change.

The configuration change 905 shown in FIG. 9 is on the premise of the following configuration. That is, a volume "VOL 50" of a storage apparatus "storage 1" and a volume "VOL 10" of a storage apparatus "storage 2" construct a remote copy pair, and the host computer can be coupled to both of the volume "VOL 50" and the volume "VOL 10". A pass configuration by which the host computer can be coupled to plural volumes is referred to as a multi-pass configuration.

In a case where "I/O error" configured as the condition 903 occurs at a pass coupling the host computer and the volume "VOL 50" (primary pass), an I/O route coupling the host computer and the volume is changed to a pass coupling the host computer and the volume "VOL 10" (secondary pass). There is a case where a designation of the configuration change is issued by the host computer per se, and there also is a case where the designation is issued from the host management computer managing the host computer. Hereinafter, an explanation will be given by taking the example in a case where the host computer changes the configuration.

Incidentally, the same also goes with a case where the FC switch 233 is constructed by a redundancy configuration. The host computer changes an I/O route from one FC switch constructing a redundancy configuration to the other FC switch also constructing the redundancy configuration.

A configuration change example 906 shown in FIG. 9 will be explained. The configuration change 906 is on the premise of the following configuration. That is, a host computer "host 10" on one side and a host computer "host 20" on the other side refer to the same data and the host computer "host 10" and the host computer "host 20" communicate with each other periodically. In a case where an error configured as condition 903 occurs in a periodical communication between the host computers, a virtual machine "VM 1" provided at the host computer "host 10" on one side is moved to the host computer "host 20" on the other side. Specifically, a computer resource used by the virtual machine "VM 1" is changed from the computer resource provided to the host computer "host 10" on one side to the computer resource provided to the host computer "host 20" on the other side.

A configuration example 907 shown in FIG. 9 will be explained. According to the configuration change 907, in a case where response time of a virtual machine "VM 2" operated on the host computer "host 20" is shorter than a prescribed threshold "10 ms", data used by the virtual machine "VM 2" is migrated to a volume "volume 10" of a storage apparatus "storage 2".

Consequently, when the condition 903 defined in FIG. 9 is established, the configuration change shown by the result 904 is automatically executed.

FIG. 10 shows the table 807 managing the virtual machine (VM) 111. The VM management table 807 stores information of the VM 111. A service level defined at the VM 111, a schedule of operating the VM, a volume for storing data, and I/O performance information are known by the VM management table 807. The management computer 201 updates the VM management table 807 by collecting information from the host computer periodically, or with reception of an information collect request from the I/O device 213 by a user as a trigger.

The VM management table 807 manages, for example, a VM ID 1001, a host ID 1002, a service level 1003, an operation schedule 1004, a storage ID 1005, a volume ID 1006, a measured time point 1007, IOPS (Input Output Per Second) 1008, and response time 1009 in correspondence with each other.

The VM ID 1001 is information for identifying the VM. The host ID 1002 is information of identifying the host computer 101 having the VM. The service level 1003 is information indicating a service level defined concerning the VM. The operation schedule 1004 is information indicating time of operating the VM. The storage ID 1005 is information of identifying the storage apparatus 1002 having a volume for storing data of the VM. The volume ID 1006 is information of identifying a volume of storing data of the VM. The measured time point 1007 is information indicating a time point for measuring a performance of the target VM. The IOPS 1008 is information indicating a measured value of IOPS of the object VM. The response time 1009 is information indicating a measured value of response time of the object VM.

In the example shown in FIG. 10, the service level 1003 shows downtime and response time as indexes. The downtime is time of stopping an application. Downtime=0 indicates that an application on the VM continues operating without stopping the application even in a case where a hardware failure occurs in operating the VM. The response time is response time of the VM 111. Response time<=10 ms indicates that response time from the VM is always equal to or shorter than 10 ms.

Although in the example of FIG. 10, a case where the VM is present is exemplified, the embodiment is not limited thereto but there may be constructed a configuration where a hypervisor is not present in the host computer 101. In this case, VM ID 1001 becomes a blank column. Also, although in the example of FIG. 10, the operation state of the VM is expressed by the operation schedule 1004, in place thereof, a result of confirming the operation state of the VM 111 may be held at the measured time 1008, and the operation state of the VM 111 may be confirmed by using the confirmation result.

FIG. 11 shows a table 808 of managing a configuration change scheme which a system manager or the like creates and registers. The configuration change scheme management table 808 stores information concerning a configuration change scheduled to be executed via the management computer 201. Information of the configuration change scheme scheduled to be executed and an anticipated effect value of the configuration change scheme are known by the configuration change scheme management table 808.

When the configuration change scheme is configured, the management computer 201 collects input information of the configuration to store to the configuration change scheme management table 808. Information stored to the configuration change scheme management table 808 is not limited to information which a system manager or the like directly inputs to the management computer 201. A value calculated by the management computer 201 based on the input information of the system manager or the like may be stored to the configuration change scheme management table 808.

The configuration change scheme management table 808 manages, for example, a configuration change scheme ID 1101, a task ID 1102, task kind 1103, a task parameter 1104, an execution start time point 1105, and an anticipated effect value 1106 in correspondence with each other. Items 1102 through 1106 are information indicating details of the configuration change scheme among items 1101 through 1106.

The configuration change scheme ID 1101 is information of identifying the configuration change scheme. The task ID 1102 is information of identifying the configuration change processing operation of a unit configuring the configuration change scheme. The configuration change processing operation of the unit is referred to as task. The task kind 1103 is information indicating a kind of the task. The task parameter 1104 is information of defining a parameter of the task. The execution start time point 1105 is information indicating an execution start time point (that is, an execution start time point of the configuration change scheme) of the task. The anticipated effect value 1106 is information indicating an operation state anticipated to obtain by executing the configuration change scheme.

In the example shown in FIG. 11, a configuration change scheme in which the configuration change scheme ID 1101 is "1" changes the processor 244 in charge of a processing operation of a volume "volume 1" provided to a storage apparatus "storage 1" is changed from "CPU 1" to "CPU 2". As the anticipated effect value 1106 in a case of executing the configuration change scheme, operation rates of processors "CPU 1" and "CPU 2" are respectively made to be "equal to or larger than 20% and equal to or less than 30%".

A configuration change scheme in which the configuration change scheme ID is "2" is configured by plural tasks "task 1" and "task 2". The anticipated effect value 1106 is configured such that an average response time of a virtual machine "VM 50" is equal to or less than "15 ms" by executing the both tasks. Incidentally, although the configuration change scheme executed by the storage apparatus is explained in FIG. 11, the embodiment is not limited thereto but there are also a configuration change scheme executed by a host computer and a configuration change scheme executed by both of the storage apparatus and the host computer.

FIG. 12 shows the configuration changing method table 809 managing means for changing a configuration. The configuration changing method table 809 stores configuration changing method which can be executed by the host computer 101 and the storage system 103. A kind of a configuration change which can be executed by the host computer 101, a kind of a configuration change which can be executed by the storage system 103, and a characteristic of the configuration changing method are known by the configuration changing method table 809. The management computer 201 updates the configuration changing method table 809 by collecting information from the computer system periodically, or with reception of an information collect request from the I/O device 213 by a user as a trigger. For example, the management computer 201 collects information of the configuration changing method concerning the storage apparatus 102 from the storage apparatus 102, and collects information of the configuration changing method concerning the host computer 101 from the host computer 101 or the like.

The configuration changing method table 809 manages configuration changing method 1201, an execution subject 1202, and a characteristic 1203 in correspondence with each other. The configuration changing method 1201 is information indicating a kind of the configuration changing method. The execution subject 1202 is information indicating a subject of executing the configuration changing method. The characteristic 1203 is information indicating a characteristic provided to the configuration changing method.

In the example of FIG. 12, the configuration changing method having downtime is shown as the characteristic 1203. The downtime is configured to be "10.0 ms" in the configuration changing method referred to as volume migration of migrating a volume. This indicates that the downtime of 10.0 ms is produced when the volume migration is executed. Although the execution subject 1202 is made to be either of the storage apparatus or the host computer, the embodiment is not limited thereto but for example, the execution subject 1202 may be a multi-pass management software. In a case where the execution subject is the multi-pass management software, host pass switching can be exemplified for the configuration changing method. In this case, downtime=0 can be exemplified for the characteristic 1203.

Although in FIG. 12, only the downtime is exemplified as the characteristic 1203, the embodiment is not limited thereto but, for example, configuration change required time required from start to end of changing the configuration as well as a formula of calculating the required time or the like may be configured to the characteristic 1203. Other characteristic may be configured to the characteristic 1203 in place of the formula or along with the formula.

Figure 13:
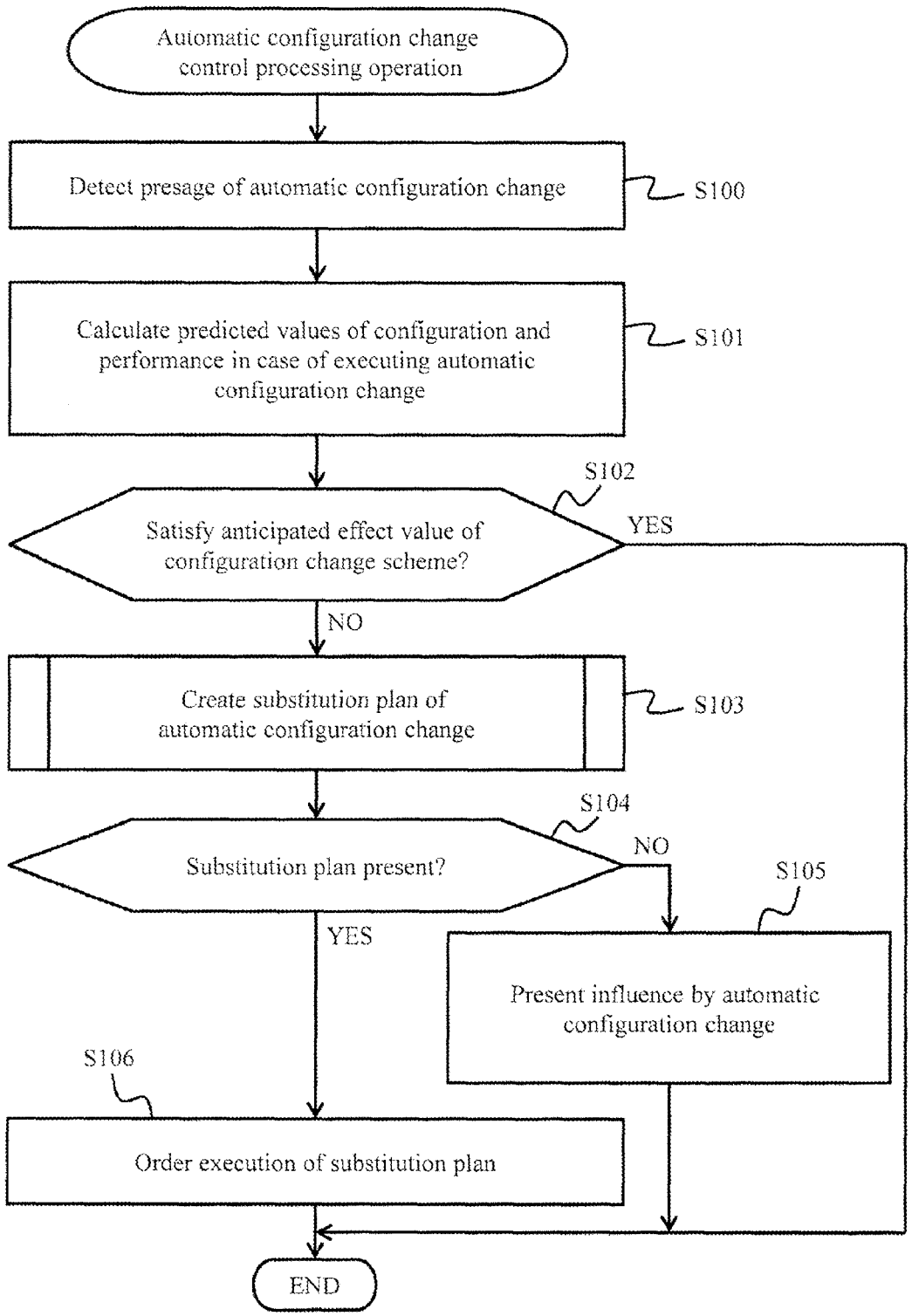
FIG. 13 is a flowchart showing a control processing operation modifying a content of an automatic configuration change.
Figure 14:
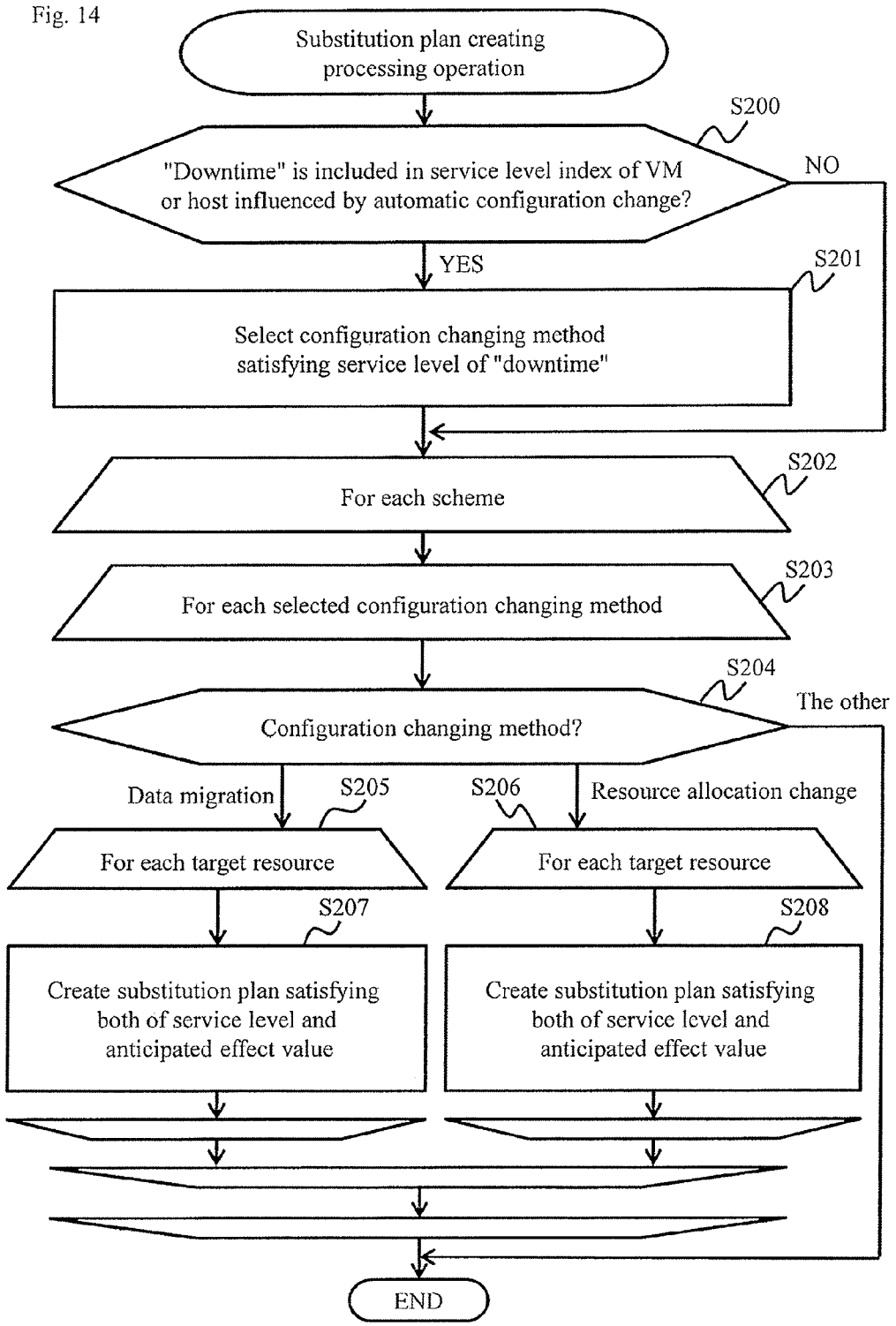
FIG. 14 is a flowchart showing processing operations of creating a substitution plan.

FIG. 13 and FIG. 14 show flowcharts indicating processing operations for controlling (modifying) an automatic configuration change. The processing operations are realized by executing the automatic configuration change control program 810 by the processor 212. FIG. 13 shows a total of the automatic configuration change control processing operation. FIG. 14 shows details of a processing operation S103 of a portion of FIG. 13. Hereinafter, a subject of the operation will be explained as the automatic configuration change control program 810.

Automatic configuration changing control operations will be explained based on FIG. 13. The automatic configuration change control program 810 detects a presage of an automatic configuration change (S100). Detection of the presage is the acquisition of information indicating when and how a configuration is changed. For example, information of changing an I/O route to "volume 1" to "volume 2" after one second is acquired. That is, the detection of the presage of the automatic configuration change is a determination whether the automatic configuration change defined in FIG. 9 is executed. An expression of the detection of the presage of the automatic configuration change may be changed as, for example, a prediction of the execution of the automatic configuration change. As methods of detecting the presage of the automatic configuration change, the following three methods will be exemplified.

A first method is a method of receiving a schedule of a configuration change transmitted from the storage system 103 and the host computer 101 (or a host management computer managing the host computer. The same goes in the following).

A second method is a method of determining a presage based on presage information of a failure transmitted from the storage system 103 and the host computer 101. For example, in a case of receiving the presage information of the failure, the automatic configuration change control program 810 determines whether the failure satisfies a content configured at the condition 903 of the automatic configuration change management table 806. In a case of determining that a failure predicted to occur satisfies the condition 903, the automatic configuration change control program 810 regards that the configuration is changed by a content configured at the result 904 of the automatic configuration change management table 806.

A third method is a method of configuring predicted performance information by calculating performance information after an elapse of a prescribed operation time period from performance history information held by the management computer 201 and predicting whether the automatic configuration change is to be executed based on the calculated predicted performance information. The automatic configuration change control program 810 determines whether the calculated predicted performance information satisfies a content configured at the condition 903 of the automatic configuration change management table 806. When the automatic configuration change control program 810 determines that the predicted performance information satisfies the condition 903, the automatic configuration change control program 810 regards that the configuration is changed by a content configured at the result 904 of the automatic configuration change management table 806.

Incidentally, the automatic configuration change control program 810 may use the least squares method or the other algorithm for calculating the predicted performance information. In a case of using the least squares method, for example, a linear line or a curve indicating a change over time of response time from the change over time of the response time 1009 of the VM management table 807.

The automatic configuration change control program 810 may calculate a tendency of the measured value of the performance information in place of the predicted performance information. The tendency in this case is, for example, an inclination of a linear line showing a change over time of the response time.

As the prescribed operation time period, a time period of updating the performance information at a successive time is preferable. The prescribed operation time period may be designated by a user, or a prescribed value previously stored to the storage resource 211 may be used.

The predicted performance information may be indicated as performance information after an elapse of a prescribed operation time period from a measured time point of the performance information, or performance information after an elapse of the prescribed operation time period from a time point of calculating the performance information may be shown.

Incidentally, the method of detecting the presage of the automatic configuration change is not limited to the three methods described above, and may be a method other than these.

Next, the automatic configuration change control program 810 calculates predicted values of a configuration and a performance in a case of executing the automatic configuration change (S101). As a method of calculating the predicted value of the performance, the method described in step S100 may be used. As other method of calculating the predicted value of the performance, there is a method based on a relationship between an I/O amount from an access source and an usage rate of a constituent element. For example, a relationship between an usage rate of an arbitrary processor 244 and a total IOPS of a volume group executing an I/O processing operation by the processor 244 is digitized and held. Thereby, it can be predicted to what % the availability of the processor 244 is configured as a result of a change of the IOPS route due to VM migration.

The automatic configuration change control program 810 determines whether an anticipated effect value of the configuration change scheme scheduled to be executed is satisfied (S102) in a case of executing the automatic configuration change. The automatic configuration change control program 810 determines, for example, whether the anticipated effect value scheduled by the configuration change scheme can be achieved even in a case of executing the automatic configuration change scheme by comparing the predicted value of the performance calculated in step S101 and a content configured at the anticipated effect value 1106 of the configuration change scheme management table 808.

In a case where a cause the automatic configuration change is a failure of the host computer 101 or the storage apparatus 102, a configuration change scheme concerning a configuration using a portion at which the failure occurs is nullified. For example, in a case where a failure occurs at the arbitrary processor 244 of the storage apparatus 102, a configuration change scheme of "changing a volume allocated to the processor 244" cannot be executed. Hence, a scheme including the configuration change which cannot be executed is nullified. In consideration of such a situation, the configuration change scheme, which includes a configuration change concerning a portion where a failure that has caused the automatic configuration change occurs, may be excluded from a determination target in step S102.

Even in a case of executing the automatic configuration change as in an initial schedule, when the automatic configuration change control program 810 determines that there is not a concern of deteriorating the anticipated effect value scheduled in the configuration change scheme (S102: YES), the automatic configuration change control program 801 normally finishes the processing operations. Because it is not necessary to modify the content of the automatic configuration change.

When the automatic configuration change control program 810 determines that the anticipated value scheduled in the configuration change scheme is not obtained in a case of executing the automatic configuration change as in the initial schedule (S102: NO), the automatic configuration change control program 810 modifies the automatic configuration change (S103). For example, the automatic configuration change control program 810 creates a substitution plan of the automatic configuration change which can simultaneously achieve the service level of the VM 111 or the host computer 101 and the anticipated effect value of the configuration change scheme (S103). Details of step S103 will be described later in reference to FIG. 14.

Next, the automatic configuration change control program 810 determines whether the substitution plan can be created as a result of executing step S103 (S104). In a case where the substitution plan of the automatic configuration change cannot be created (S104: NO), the automatic configuration change control program 810 presents an influence of execution of the automatic configuration change effected on the configuration change plan to a system manager or the like (S105), and normally finishes this processing operation. The automatic configuration change control program 810 outputs information concerning the influence of the configuration change scheme by executing the automatic configuration change. For example, the automatic configuration change control program 810 notifies the influence to a system manager or the like via the I/O device 213 of the management computer 201. The influence may be notified by means of an electronic mail or the like.

Here, the influence of the automatic configuration change effected on the configuration change scheme is that as a result of executing the automatic configuration change, even when the scheduled configuration change scheme is executed, there is a possibility that the anticipated effect value cannot be achieved. The execution of the influenced configuration change scheme may be stopped after presenting the influence of the automatic configuration change effected on the configuration change scheme in step S105.

In a case where the substitution plan of the automatic configuration change can be created (S104: YES), the automatic configuration change control program 810 executes the substitution plan (S106), and normally finishes the processing operations.

In a case where plural substitution plans are present concerning an automatic configuration change, any one of the plural substitution plans may be selected at random, or a prescribed evaluation may be executed concerning the plural substitution plans, and any one of the plural substitution plans may be selected based on a result of the evaluation. For example, an I/O performance is made to be an evaluation axis, and a substitution plan having the highest predicted value of the I/O performance is selected as the substitution plan. Incidentally, one substitution plan may be selected by a method other than the method described above.

FIG. 14 is a flowchart showing details of step S103 in FIG. 13. According to the processing operation, there is created a substitution plan of the automatic configuration change which can achieve both of the service level of the VM 111 or the host computer 101, and an anticipated effect value of a constitution change scheme scheduled to be executed.

According to the processing operation, it is determined whether the service level of the VM or the host computer influenced by the automatic configuration change includes a content defining downtime (S200). The automatic configuration change control program 810 refers to the service level 1003 of the VM management table 807, and determines whether the content defining the downtime is configured as the service level. When the automatic configuration change control program 810 determines that the downtime is not configured as the service level (S200: NO), the automatic configuration change control program 810 skips step S201, and proceeds to step S202 described later.

In a case where the automatic configuration change control program 810 determines that the downtime is configured to the service level of an element (host computer, VM) influenced by the automatic configuration change (S200: YES), the automatic configuration change control program 810 selects configuration changing method satisfying the service level of the downtime from selectable configuration changing method (S201).

The automatic configuration change control program 810 selects, for example, configuration changing method satisfying the service levels of the VM and the host computer using a resource configuring a target of the automatic configuration change from the configuration changing method 1201 registered to the configuration changing method table 809.

The VM and the host computer using the resource configuring the target of the automatic configuration change is the VM or the host computer using "volume 50" of "storage 1" in a case of the configuration change example 905 shown in the automatic configuration change table 806 of FIG. 9. The VM and the host computer using the resource configuring the target of the automatic configuration change can be specified by referring to the VM management table 807.

Even in a case where "downtime=0" is configured to the service level 1003 of the VM management table 807, so far as the downtime is brought about in a time zone in which the VM is not operated, the downtime is acceptable. For example, in a case where an execution time point of the configuration changing method is not included in a time zone defined in the operation schedule 1004, the VM is not operated when the configuration change is executed. In this case, even when the VM is stopped, no influence is not effected on an application. Therefore, in this case, the configuration changing method may be selected by disregarding the service level concerning the downtime.

Incidentally, depending on the configuration changing method, there is configuration changing method which requires arbitrary time from an operation start time point to an operation end time point of the configuration change as in, for example, "VM data migration" of FIG. 12. Further, a timing of an occurrence of downtime in executing the configuration changing method differs by a kind of the configuration changing method.

Consequently, even in a case where it becomes clear that a timing of executing step S201 is within a time zone during which the VM is not operated from the VM operation schedule 1004, there is conceivable a situation in which the VM is operated at a timing of an occurrence of downtime by executing the configuration changing method. In this case, as a result, there is a concern that the situation acts contrary to the downtime defined in the service level 1003.

In order to avoid the problem, according to the embodiment, downtime occurrence time of each configuration changing method is managed by the characteristic 1203 by the configuration changing method table 809. The automatic configuration change control program 810 may determine an influence of downtime effected on the service level by referring to the time at which the downtime occurs and the content of the operation schedule 1004 of the VM management table 807 in a case of selecting the configuration changing method.

The automatic configuration change control program 810 determines whether the selected configuration changing method is data migration, a resource allocation change, or other than these (S203, S204) for each configuration change scheme scheduled to be executed (S202).

In a case where a determination result in step S204 is "data migration", the automatic configuration change control program 810 creates a substitution plan by calculating a performance after data migration (S207) for each resource of a target object (S205), and normally finishes the processing operation. The substitution plan created in step S207 configures a migration destination by a resource satisfying both of the service level of the I/O performance and the anticipated effect value of the configuration change scheme. A method of calculating the performance after migration is similar to a method described in step S101 of FIG. 13.

The automatic configuration change control program 810 selects a resource satisfying a restriction condition of target configuration changing method in order to select the resource satisfying both of the service level of the I/O performance and the anticipated effect value of the configuration change scheme. The automatic configuration change control program 810 calculates performances respectively for the resources satisfying the restriction condition, and selects a resource simultaneously satisfying the service level and the anticipated effect value of the configuration change scheme.

The restriction condition of the configuration changing method differs for respective configuration changing method. In a case of "CPU allocation change" shown in the example of FIG. 12, the restriction conditions are, for example, that the processor 244 of an allocation destination is present in the same storage apparatus, that a number of volumes allocated to the processor of the allocation destination is equal to or less than a prescribed upper limit value, and so on. A restriction condition other than these will do.

In a case where the determination result in step S204 is "resource allocation change", the automatic configuration change control program 810 calculates a performance after changing the resource allocation, and creates a substitution plan (S208) for each resource of the allocation change target (S206), and normally finishes the processing operation. The substitution plan created in step S208 selects a resource satisfying both of the service level of the I/O performance and the anticipated effect value of the configuration change scheme as an allocation change destination. A method of calculating the performance after the resource allocation change is similar to a method shown in step S101 of FIG. 13.

The automatic configuration change control program 810 selects a resource satisfying the restriction condition of the target configuration change and calculates a performance concerning each selected resource in order to select a resource satisfying both of the service level of the I/O performance and the anticipated effect value of the configuration change scheme. The automatic configuration change control program 810 selects a resource simultaneously satisfying the service level and the anticipated effect value of the configuration change scheme. As described above, the restriction condition of the configuration changing method differs for each configuration changing method.

Incidentally, in the processing operation shown in FIG. 14, the substitution plan satisfying the service level of the I/O performance and the anticipated effect value of the configuration change scheme is created from the single configuration change. However, for example, depending on a state of a configuration, a state of a performance or the like, there is a case where a desired configuration change scheme cannot be created unless plural configuration changes are combined.

For example, there is conceivable a case where in order to change the processor 244 controlling a certain volume to the processor 244 in the other storage apparatus 102, a VM provided on the volume is migrated to a volume in the other storage apparatus. If the case is executed, the case can satisfy both of the service level of the I/O performance and the anticipated effect value of the configuration change scheme. However, the case acts contrary to the restriction condition of the configuration changing method, and therefore, the case cannot be executed in the current configuration.

In order to deal with the case, the automatic configuration change control program 810 omits, in step S207 and step S208, the processing operation of "selecting a resource satisfying the restriction condition of the target configuration changing method in order to select a resource satisfying the service level of the I/O performance and the anticipated effect value of the configuration change scheme".

In place thereof, the automatic configuration change control program 810 calculates performances concerning all resources and selects all of resources simultaneously satisfying the service level and the anticipated effect value of the configuration change scheme, and creates a first configuration change configuring a data migration destination or an allocation change destination by a selected resource.

The automatic configuration change control program 810 determines whether the configuration can be changed to a configuration satisfying the restriction condition by using the configuration changing method selected in step S201 concerning a resource which does not satisfy the restriction condition of the target configuration changing method in the resource configuring the target of the first configuration change.

When it is determined that the configuration change satisfying the restriction condition can be executed, the automatic configuration change control program 810 configures a second configuration change by the configuration change. Further, the automatic configuration change control program 810 creates a configuration change scheme having the first configuration change and the second configuration change respectively as tasks. The automatic configuration change control program 801 can configure the substitution plan of the automatic configuration change from the plural configuration changes by executing the processing operations described above.

Incidentally, by executing the substitution plan of the automatic configuration change, it is also conceivable to release the configuration of the automatic configuration change which is configured to an arbitrary resource before executing the substitution plan. Hence, the configuration of the automatic configuration change which is released as a result of executing the substitution plan may be created by being included to the substitution plan. Thereby, after executing the substitution plan concerning a certain resource, the automatic configuration change can be reconfigured to the resource, and therefore, the reliability of the system can be maintained, and the handiness of use is improved.

An example of a method of including the reconfiguration of the automatic configuration change to the substitution plan will be explained. For example, when the substitution plan is determined (S106), the automatic configuration change control program 810 determines whether an automatic configuration change can be reconfigured for an arbitrary resource after executing the substitution plan.

The automatic configuration change control program 810 selects a configuration change plan including the reconfiguration of an automatic configuration change with preference, and determines the plan selected with preference as a substitution plan concerning a resource determined to be able to reconstruct the automatic configuration change. A condition of enabling the reconfiguration of the automatic configuration change differs by a kind of the configuration change.

In a configuration change example 905 of the automatic configuration change management table 806, a remote copy pair is constructed by a volume of a change destination "volume 10" and an arbitrary volume in a configuration after executing the substitution plan. Further, in the configuration change example 905, multi-pass is configured such that the host computer can access to the respective volumes configuring the remote copy pair.

Consequently, in the configuration after executing the substitution plan, the remote copy pair can be constructed with an arbitrary volume, and it can be determined that the substitution plan which can configure multi-pass in the host computer can be determined to be a substitution plan which can reconfigure the automatic configuration change.

In a case where the automatic configuration change cannot be reconfigured to an arbitrary resource after executing the substitution plan, a step of presenting an influence by executing the substitution plan may be included in the flowchart of FIG. 13. The influence by the substitution plan is that the configured automatic configuration change is released as a result of executing the substitution plan. The method of presenting the influence by the automatic configuration change described above can be used for a method of presenting the influence of the substitution plan.

According to the embodiment configured consequently, a content of the automatic configuration change can be modified in consideration of a change in the state of the host computer 101 and the storage apparatus 102.

According to the embodiment, the substitution plan of the automatic configuration change can be created and executed to satisfy both of an anticipated effect of the automatic configuration change and an anticipated effect of the configuration change scheme under a situation where the automatic configuration change executed in accordance with the current state of the computer system and the configuration change scheme planned beforehand by a person in charge of system management for improving an operation state are executed independently from each other, and the configuration change scheme cannot be executed unless an approval is obtained from the person in charge of system management. Consequently, the reliability and the management efficiency of the computer system can be improved.

According to the embodiment, as described above, in a case where the configuration change is automatically executed in accordance with a previously determined condition, the configuration change achieving the anticipated effect value of the configuration change scheme can be executed as the substitution plan of the previously defined automatic configuration change while maintaining the service level of the VM and the host computer. Thereby, for example, even in a case where there is a configuration which changes the configuration automatically in accordance with a previously determined condition as in a cluster configuration, the configuration change scheme which is created by the system manager by obtaining the approval from the person in charge of management beforehand can be executed. Therefore, the operation efficiency of the system management can be improved.

Incidentally, this invention is not limited to the embodiment described above. The skilled person can carry out various additions, changes or the like within the range of this invention. For example, technical features of this invention described above can be executed by pertinently combining the technical features.

REFERENCE SIGNS LIST

101 Host computer
102 Storage apparatus
103 Storage system
201 Management computer
233 Switch

The invention claimed is:

1. A management computer which is coupled to a computer and a storage apparatus, the management computer comprising:

a memory configured to store a piece of first configuration information indicating plural logical storage areas provided by the storage apparatus, a piece of second configuration information stored in a first logical storage area among the plural logical storage areas and indicating an operation requirement of a prescribed object executed by the computer, and a piece of configuration change scheme information indicating a scheme of a first configuration change scheduled to be executed by the computer or the storage apparatus; and a microprocessor coupled to the memory, wherein the microprocessor is configured to:

determine whether a second configuration change configured beforehand so as to be executed in accordance with a prescribed condition in the computer or the storage apparatus is executed;

predict, in a case where it is determined that the second configuration change is executed, a performance index value concerning a prescribed performance index for the computer or the storage apparatus in a case of executing the second configuration change;

determine whether a previously configured anticipated effect value concerning the configuration change scheme is satisfied based on the predicted performance index value; and create a substitution plan satisfying both of the operation requirement of the prescribed object and the anticipated effect value in a case where it is determined that the anticipated effect value is not satisfied.

2. The management computer according to claim 1, wherein the microprocessor is configured to execute the substitution plan, in a case where the substitution plan can be created.

3. The management computer according to claim 2, wherein the microprocessor is configured to, in a case where a configuration of the second configuration change released as a result of executing the substitution plan can be included in the substitution plan, create the substitution plan such that a reconfiguration of the second configuration change is included.

4. The management computer according to claim 3, wherein the microprocessor is configured to output a notification stating that the anticipated effect value of the configuration change scheme cannot be achieved, in a case where the substitution plan cannot be created.

5. The management computer according to claim 4, wherein the microprocessor is configured to halt the configuration change scheme, in a case where the substitution plan cannot be created.

6. The management computer according to claim 5, wherein the microprocessor is configured to calculate, as the performance index value, an I/O performance and a resource usage rate for the computer or the storage apparatus in a case where the second configuration change is executed.

7. The management computer according to claim 1, wherein the substitution plan includes plural configuration changes.

8. The management computer according to claim 1, wherein the prescribed object is a virtual machine.

9. The management computer according to claim 1, wherein the second configuration change is a processing operation of switching a cluster configuration, executed with an occurrence of a failure as a trigger.

10. The management computer according to claim 1, wherein the second configuration change is a data migration processing operation, executed with a change in a state of the logical storage area as a trigger.

11. The management computer according to claim 1, wherein the second configuration is a resource allocation change processing operation, executed with a change in a state of the logical storage area as a trigger.

12. A method of managing a computer system including a computer and a storage apparatus, by using a management computer, wherein the management computer:

stores an operation requirement of a prescribed object that is stored in a prescribed logical storage area in plural logical storage areas provided by the storage apparatus and is executed by the computer, and a piece of configuration change scheme information indicating a scheme of a first configuration change scheduled to be executed by the computer or the storage apparatus;

determines whether a second configuration change configured beforehand so as to be executed in accordance with a prescribed condition in the computer or the storage apparatus is executed;

predicts, in a case where it is determined that the second configuration change is executed, a performance index value concerning a prescribed performance index for the computer or the storage apparatus in a case of executing the second configuration change;

determines whether a previously configured anticipated effect value concerning the configuration change scheme is satisfied based on the predicted performance index value; and creates a substitution plan satisfying both of the operation requirement of the prescribed object and the anticipated effect value in a case where it is determined that the anticipated effect value is not satisfied.

13. The management method of a computer system according to claim 12, wherein the management computer:

executes the substitution plan, in a case where the substitution plan can be created; and outputs a notification stating that the anticipated effect value of the configuration change scheme cannot be achieved, in a case where the substitution plan cannot be created.

14. The management method of a computer system according to claim 13, wherein the management computer halts the configuration change scheme, in a case where the substitution plan cannot be created.

* * * * *